(12) United States Patent
Wong et al.

(10) Patent No.: US 11,675,536 B2
(45) Date of Patent: Jun. 13, 2023

(54) INTELLIGENT SCHEDULING FOR GARBAGE COLLECTION

(71) Applicant: EMC IP Holding Company LLC, Hopkinton, MA (US)

(72) Inventors: Tony T. Wong, Milpitas, CA (US); Abhinav Duggal, Jersey City, NJ (US); Joseph Jobi, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 94 days.

(21) Appl. No.: 17/069,223

(22) Filed: Oct. 13, 2020

(65) Prior Publication Data

US 2022/0113902 A1   Apr. 14, 2022

(51) Int. Cl.
*G06F 3/06* (2006.01)

(52) U.S. Cl.
CPC ............ *G06F 3/0659* (2013.01); *G06F 3/065* (2013.01); *G06F 3/0619* (2013.01); *G06F 3/0652* (2013.01); *G06F 3/0674* (2013.01)

(58) Field of Classification Search
CPC ...... G06F 3/0659; G06F 3/0619; G06F 3/065; G06F 3/0652; G06F 3/0674
See application file for complete search history.

(56) References Cited

U.S. PATENT DOCUMENTS

| | | | | |
|---|---|---|---|---|
| 8,671,249 B2* | 3/2014 | Talagala | ............... | G06F 11/1008 |
| | | | | 710/36 |
| 9,569,352 B2* | 2/2017 | Marcu | ................. | G06F 12/0238 |
| 2016/0291876 A1* | 10/2016 | Alatorre | ................ | G06F 3/0685 |
| 2017/0212678 A1* | 7/2017 | Blount | .................... | G06F 3/067 |
| 2020/0401516 A1* | 12/2020 | Ke | ....................... | G06F 13/1689 |

* cited by examiner

*Primary Examiner* — Eric Cardwell
(74) *Attorney, Agent, or Firm* — Womble Bond Dickinson (US) LLP (57) ABSTRACT

An intelligent method of scheduling garbage collection (GC) in a storage system. A GC scheduler obtains capacity utilization and ingest rate of the storage system and calculate therefrom a predicted capacity utilization. When the predicted capacity utilization reaches a threshold, the GC scheduler invokes GC, but otherwise skips GC until such time as predicted capacity utilization reaches the threshold. The ingest rage may be calculated by performing linear fit on past data ingest. The GC scheduler may calculate predicted capacity utilization periodically according to preset period. The GC scheduler may calculate the predicted capacity utilization to a future date beyond the next period. The future date may be at least as far as the next period plus total ingest time.

18 Claims, 7 Drawing Sheets

INTELLIGENT SCHEDULING FOR GARBAGE COLLECTION

TECHNICAL FIELD

This disclosure relates to management of data backup, especially in system having deduplication and garbage collection capabilities.

BACKGROUND

In managing data storage for backup and recovery often one must balance the reduction in storage space needed and the additional load on compute and I/O operations required to reduce the storage space. Deduplication (de-dup) is an example of a tool that reduces the amount of storage needed, but requires additional computing. When implementing de-dup, the data is divided into chunks or segments (e.g., size 8K pre-compression) and only one of the duplicate segments is stored. The appropriate references or pointers are included in the segments tree whenever the duplicate segment is repeated. The segments are packed and stored in immutable containers (e.g., size 4.5 MB), i.e., the containers are not modifiable.

Over time, when a file is deleted, the segments referenced by the file may no longer be needed. However, many systems (e.g., Data Domain File Systems—DDFS) do not track the number of references for each segments. Consequently, it is not known whether other files may still reference some of the same segments. Therefore, when the file is deleted, the segments cannot be removed to free the storage space they occupy. However, that means that there may be dead space within the containers, i.e., space occupied by segments that are no longer needed.

Reclaiming the dead space is done by periodically running garbage collection (GC) operation. The GC enumerates all live references to each segment so as to identify segments having no live references. These segments occupy dead space. As indicated, the containers are not immutable, so by deleting segments the containers will have many unused holes in them. To reclaim dead space, the GC construct a new container and fills it with live segments from the other containers, and then discards resulting empty containers.

Garbage collection is a very lengthy operation that is measured in days. It requires a lot of computing I/O bandwidth and storage resources. Consequently, the system's performance is degraded during the time the GC runs. Generally, GC is run once a week, which means that for a few days each week the system performance is degraded.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Figure 1:
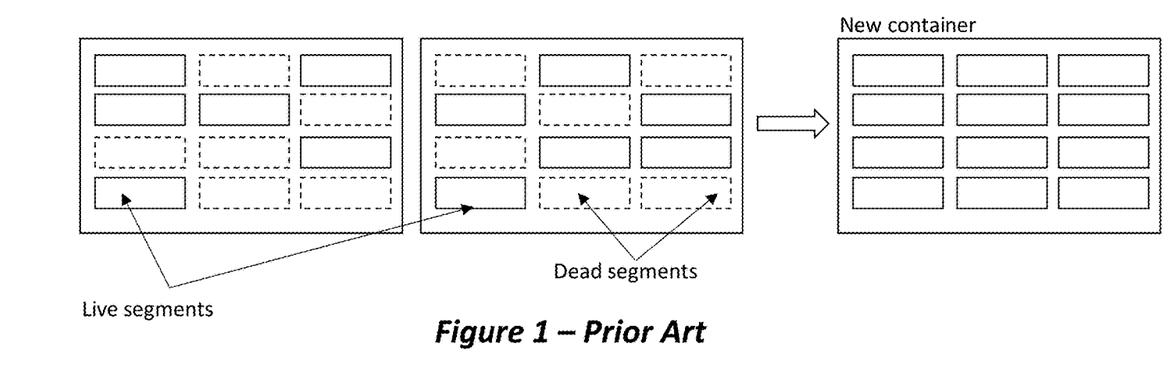
FIG. 1 is a schematic illustrating garbage collection according to the prior art.
Figure 2:
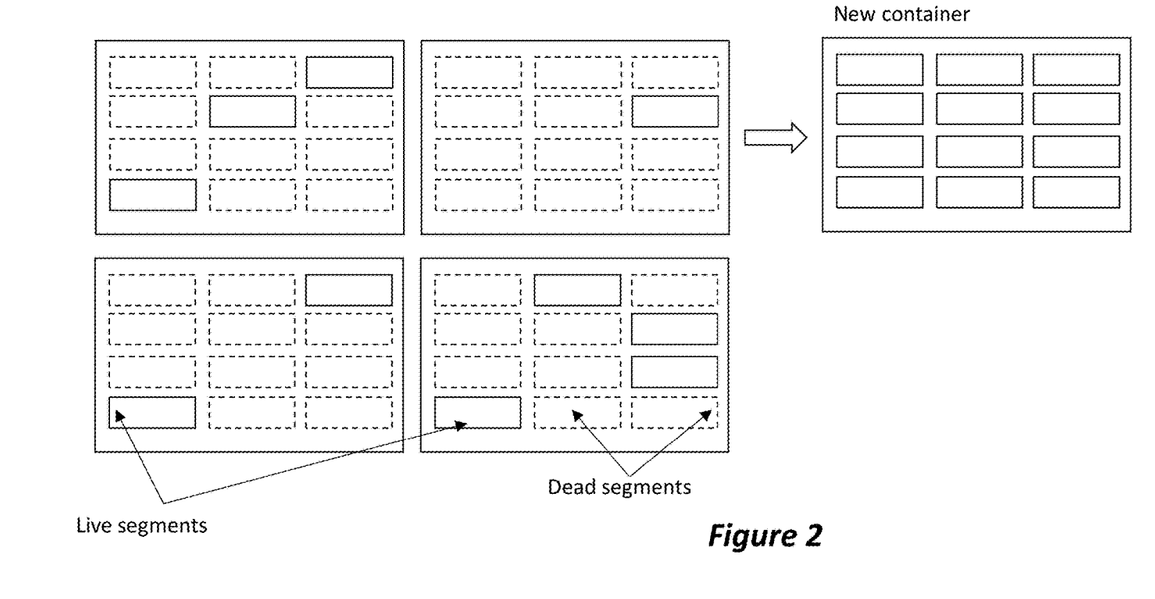
FIG. 2 is a schematic illustrating delayed garbage collection.

Aspects of this disclosure include methodologies to intelligently select timing for running garbage collection. The inventors have identified various detriments to running GC at set periods. FIG. 1 illustrates the prior art process of moving live segments from old containers into a new container. To clean the dead/unreferenced segments, GC scans the entire system and identify the dead segments in the containers and copy forward the live segments, possibly from multiple containers to new containers. Frequent run of GC is not efficient because many data containers will still contain a high percentage of live segments. Many segments must be copied forward in order to free up a small portion of the container. Furthermore, the same segment can be copied forward several times before it finally dies. Conversely, if GC can be delayed, there will be more dead segments in the containers and less live segments to copied forward. This is illustrated in FIG. 2. As illustrated in FIG. 2, by delaying GC, fewer live segments need to be copied forwards, and the amount of storage freed is higher, i.e., the return on the investment in running GC is higher.

Moreover, in a deduplication file system, if every segment is perfectly deduped, i.e. only one copy exists, reading back a file can become very inefficient after running multiple GCs. Since each GC moves segments from multiple containers into new containers, the logically contiguous segments can become physically distributed randomly over many containers. Additionally, in some systems, e.g., DDFS, duplicate segments can exist, and GC will remove the duplicates to save space at the expense of read back performance. By deferring GC, the read back will be very close to sequential I/O with high performance.

Figure 3:
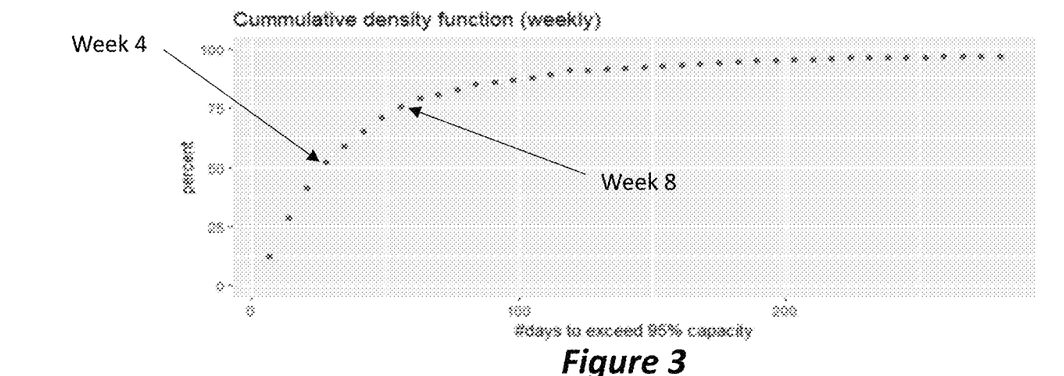
FIG. 3 is a plot of utilization data calculated for a large sample of systems to determine time to reach 95% capacity utilization.

Repeated GC also impacts maintenance and reliability of the hardware. Unnecessary GC requires intensive disk I/O, which consumes more power and degrades the lifetime of the disk storage. To illustrate, a large sample of systems was investigated to determine how long it would take for each system to reach 95% of capacity utilization if GC was not run. The data was plotted weekly, as presented in FIG. 3, wherein each data point indicates the percentage of the sample that would reach 95% capacity—the y-axis indicating the percentage of the sample and the x-axis indicating the number of days to reach 95%. As can be seen from the plot, on the fourth week only half of the sampled systems would have reached 95% capacity utilization, which means that under normal weekly GC, by that time GC would have needlessly run four times for at least half of the systems sampled. Indeed, even by week eight there are still 25% of the systems that would not have reached 95% capacity utilization and could have avoided eight runs of GC.

Of course, delaying GC for too long may cause storage capacity problems. Therefore, the inventors sought to discover an efficient way of determining how often to run GC and determined that the process should involve two steps: first, determine a simple and reliable capacity prediction algorithm and second, implement an intelligent GC scheduling policy based on the prediction algorithm. Notably, if the system's utilized capacity can be precisely predicted, there is no need to run GC until it is almost full. For example, if the system will be full in 40 days and it takes 3 days to run GC, GC can be scheduled to run on the 36th day from the current day. Conversely, according to standard prior art periodic GC, i.e., without this intelligent scheduling, the system will needlessly run GC 5 times in the 40 days period.

Therefore, in disclosed embodiments a process is implemented that obtains the ingest rate of the storage system and periodically calculates a predicted capacity utilization. When the predicted capacity utilization is below a threshold, there is no need to run GC at that period. However, when the predicted capacity utilization reaches the threshold, GC is invoked. Specific examples of how the process may be implemented are provided below.

The capacity used by the system equals the amount of data ingest less the data cleaned by GC. Investigating the capacity prediction problem, the inventors noted that while data ingest is rather linear, data deletion rate is non-linear and unpredictable. Consequently, the resulting capacity usage is rarely linear and most of the time unpredictable. Since deletions can be very arbitrary and follow no statistical pattern, any standard statistical methods to predict capacity utilization are likely to fail.

Data ingest rate is determined by the system's hardware configuration and the number of backup clients. Unless there is some change in these factors, the ingest rate is almost a constant. The total data ingest may generally be graphed as linear segments following a piecewise linear model. Therefore, if GC does not run, the future capacity utilization at time t can be completely determined by the ingest rate alone:

$$C(t)=C_0+R^*(t-t_0) \quad (1)$$

Where $C_0$ is the current capacity utilization at time $t_0$ and R is the ingest rate.

The above equation (1) is a little oversimplified in that the ingest rate is not exactly linear but is rather piecewise linear, as will be demonstrated below. Moreover, at each linear segment the slope, i.e., ingest rate, may differ. Therefore, the proper prediction algorithm needs to determine the most recent linear segment of the ingest graph and use the slope of that segment as the ingest rate for the prediction. For example, linear fit may be always applied to ingestion data for the past fixed number of days, say 30 days, and the slop determined as the current ingest rate. However, the regression process described below is rather efficient and fast, such that it can be easily employed to provide more accurate results using variable length of past ingest data.

Example for Identifying the Most Recent Linear Segment

As the system runs, data is collected for total (cumulative) data ingested, d. Generally the data may be plotted and line segments may be fit to the plot, extending backwards to different lengths of time so as to find the segment that best fit the data at the time of determination. The following is an example for such a process.

Suppose there are N data points, $d_1, d_2, d_3, \ldots d_N$, extending past N days from the present. Linear regression is performed on the segments:

$$S_m = [d_{N-m+1}, d_{N-m+2}, d_{N-m+3}, \ldots d_N] - \text{the last } m \text{ points}$$

$$S_{m+1} = [d_{N-m}, d_{N-m+1}, d_{N-m+2}, \ldots d_N] - \text{the last } m+1 \text{ points}$$

$$\ldots$$

$$S_N = [d_1, d_2, d_3, \ldots d_N] - \text{the last } N \text{ points}$$

Where m is a minimum threshold, e.g. 30. That means that at least 30 data points will be used for the linear regression.

For each segment, the linear regression model will produce a goodness of fit measure:

$$r\text{-squared} = 1 - \frac{SS_{res}}{SS_{tot}}$$

where $SS_{res}$=sum of squares of the residues=$\Sigma_k(d_k-f_k)^2$ and $SS_{tot}$=total sum of squares=$\Sigma_k(d_k-\bar{d})^2$, $\bar{d}$=mean of the data A r-squared value of 1 implies a perfect fit and a value of 0 means very bad fit. The segment with the highest r-squared will be chosen as the most recent linear segment for the prediction. Note that other indicators of goodness of fit may be used. For further discussion of r-squared as measure of goodness of fit, see Pang-Ning Tan, Michael Steinbach, and Vipin Kumar, Introduction to Data Mining, Pearson Education, 2006, and Chamness, M., Capacity Forecasting in a Backup Storage Environment, LISA'11: Proceedings of the 25th Large Installation System Administration Conference (December 2011).

Figure 4A:
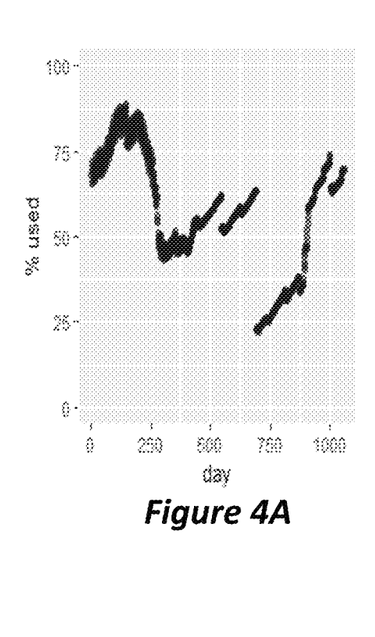
FIGS. 4A-4C are sequence of graphs demonstrating how the linear regression algorithm is used to predict future capacity utilization, according to one or more embodiments of the disclosure.
Figure 4B:
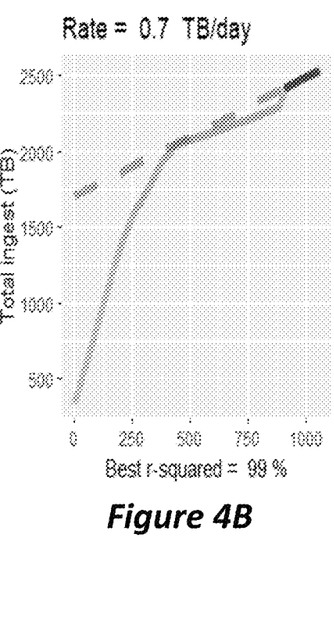
Figure 4C:
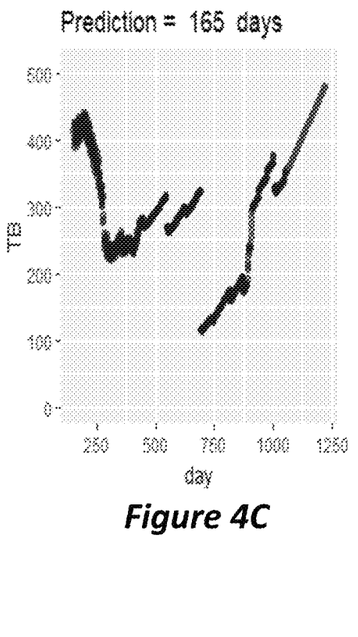

FIG. 4A is a plot of capacity utilization data for one system, wherein the y-axis indicates the percentage capacity utilization and the x-axis indicates time in days. As seen, capacity utilization appears random and includes discontinuities that may have been caused by hardware changes and/or data deletion operations. In FIG. 4B the cumulative data ingest is plotted (ignoring deletions), wherein the y-axis indicates total data ingested and the x-axis indicates time in days. As can be seen, the plotted data results in linear segments wherein each segment indicates a different ingest rate, defined by the hardware deployed at that particular time. In the example of FIG. 4B the best linear fit resulted in r-squared value of 99% and ingest rate of 0.7 TB/day. The ingest rate determined from FIG. 4B is then used with the plot of FIG. 4A to generate the prediction illustrated in FIG. 4C. If the total available capacity of the system is 500 TB, then from FIG. 4C one may surmise that the system may reach 95% of available capacity in 165 days. Therefore, at this point there is no need to run GC on this system for about 160 days. However, rather than rely on a single prediction, this calculation may be repeated periodically, as will be explained below in the intelligent GC scheduler segment.

Figure 5A:
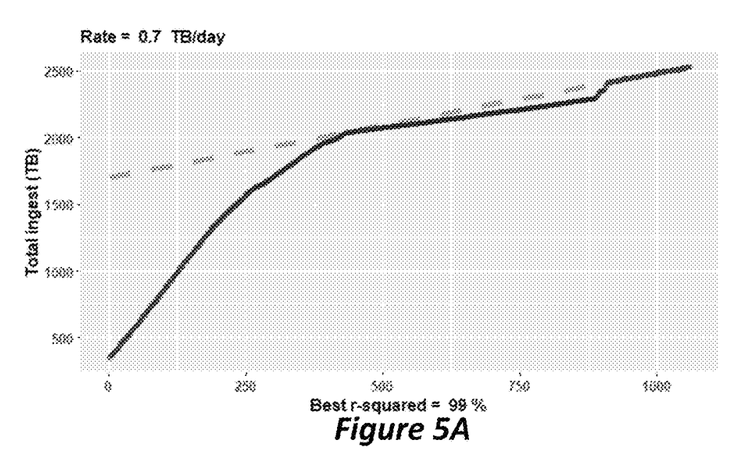
FIGS. 5A-5D are sequence of graphs demonstrating how the r-squared algorithm works according to one or more embodiments of the disclosure.
Figure 5B:
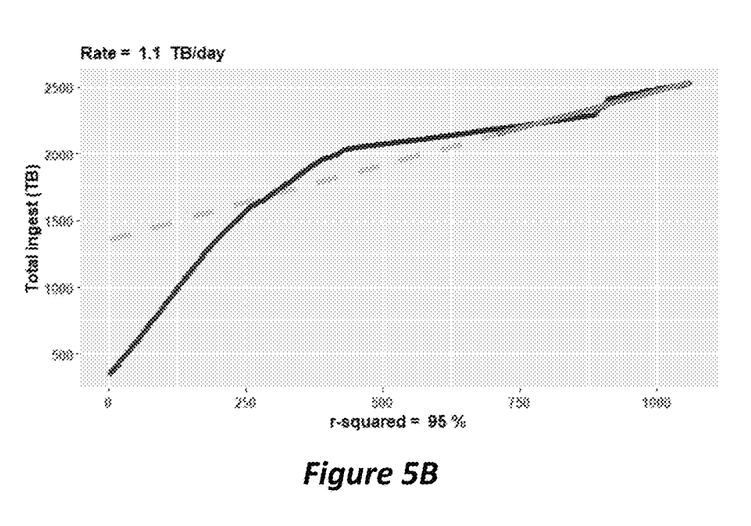
Figure 5C:
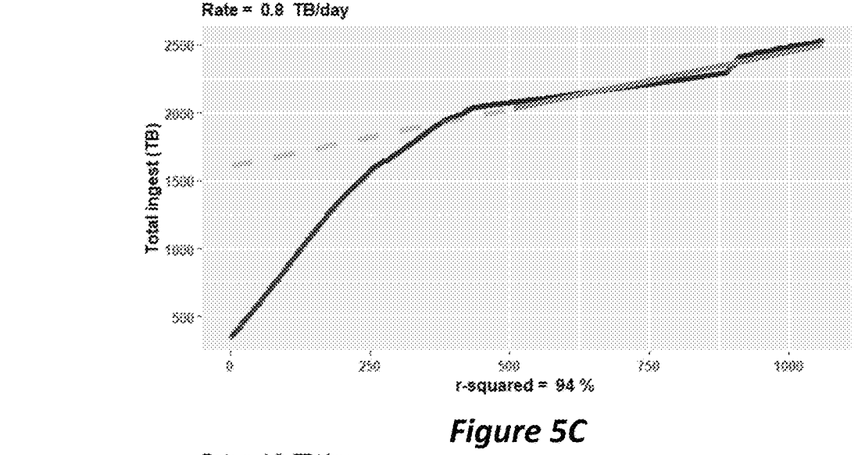
Figure 5D:
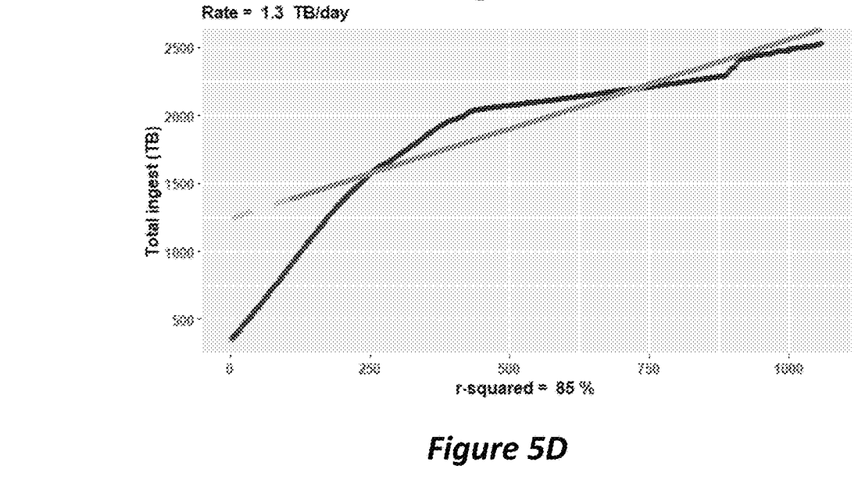

FIGS. 5A-5D illustrate graphed data with different linear segments of different length fit to the curve extending backwards from the current time. As FIG. 5A illustrates, the best r-squared is at 0.99 and the ingest rate for that data segment is 0.7 TB/day, which will be the ingest rate used in the prediction. The r-squared becomes smaller when the fit is poor. In the last graph of FIG. 5D, where almost all the data points are included in the regression model, it is obvious that the regression line does not fit the data well and the r-squared is 0.85.

In FIGS. 5A-5D, since only the slope of the ingest graph is needed, the total ingest is normalized to 0 at the first data point. Also, there is no need to trace back all the way in time to accumulate all the ingest data.

Once the best fit linear segment is selected, its slope defines the data ingest rate and it can be used in equation (1) above to predict the capacity at a future time t. The next step is to construct a scheduler that can accept the capacity prediction and determine the optimum time to perform GC.

Intelligent GC Scheduler

For the purpose of intelligently scheduling GC, the following parameters are defined: $\propto$=maximum percentage capacity allowed (leaving safety margin); T=number of days for the capacity utilization prediction; P=period length of the scheduler to perform prediction calculations, e.g. 7 days; and G=maximum GC run time, i.e., the longest amount of time it takes the GC to complete operation.

The scheduler runs periodically once every P days. Instead of always invoking GC, the scheduler will use the prediction algorithm to make the capacity prediction for the T-th day from the current day. If the prediction is less than a, it will not invoke GC for that time period, else it will invoke GC immediately.

The following may be used as guidance in setting the scheduler's parameters. First, as noted a should not be set too close to 100% so as to keep some safety margin. Also, to ensure GC can complete in time, T must be set to a value greater than P+G. For example, if T is set for nine days, but P is set for seven days and the maximum GC time may be four days, it may lead to surpassing capacity in case, e.g., the system will exceed 95% threshold on the tenth day. This is because on the first seven day period the capacity would be below the threshold and the scheduler will not invoke GC. However, when on the second seven day period the scheduler attempts to invoke GC, there's insufficient time for the GC to complete before the system reaches the 95% threshold. Therefore, when the period is set at seven days and GC run time is four days, it's better to set the number of days T to at least fourteen days. In this way, the scheduler would catch capacity overrun that may occur during the second period.

From computing load perspective, it is very inexpensive to make capacity prediction, so technically the scheduler can run very often to detect a sudden change in the ingest rate. However, as it will take a few days to establish a clear trend in the new ingest rate, the recommendation is to set the period P at about seven days. This would enable sufficient time to drive better curve fitting to the latest ingest rate.

To provide a numerical example, assume that the regression described above computes an ingest rate of 1 TB/day. Also assume that the parameters are set for threshold at 95%, period set at seven days, and time at twelve days. The maximum capacity is 100 TB. The first run of the scheduler is taken at an arbitrary time to, at which point the capacity was say 80 TB. The capacity prediction for the T twelve days is then 80 TB+(12*1 TB/day)=92 TB. This is lower than the 95% threshold, which would be 95 TB. Thus, the scheduler would not invoke GC.

On day seven, $t_7$, the system's capacity is 80 TB+(7*1 TB/day)=87 TB. The scheduler compute prediction for T twelve days hence, i.e., day 19 from to. Assuming ingestion rate remains the same, capacity is predicted at 87 TB+(12*1 TB/day)=99 TB, which exceeds the 95 TB threshold. Therefore, the scheduler will invoke GC immediately. Assuming GC runs for three days and reduces capacity to 60 TB. The next scheduler run is on day fourteen $t_{14}$, at which time the system's capacity is 64 TB. The prediction for twelve day hence, i.e., day $t_{26}$, is 76 TB. Therefore, the scheduler would not invoke GC.

Thus, disclosed aspects involve a computerized method for executing garbage collection in a backup system, the method comprising: ingesting data for backup storage; at each preset time period, obtaining ingestion rate of the ingesting data process; obtaining current system capacity indicating current amount of storage space occupied by stored data; using the ingestion rate and current system capacity to estimate prospective system capacity at a future time date; and, whenever the prospective system capacity exceeds a preset threshold invoking garbage collection (GC), otherwise skipping garbage collection until next preset time period.

Figure 6:
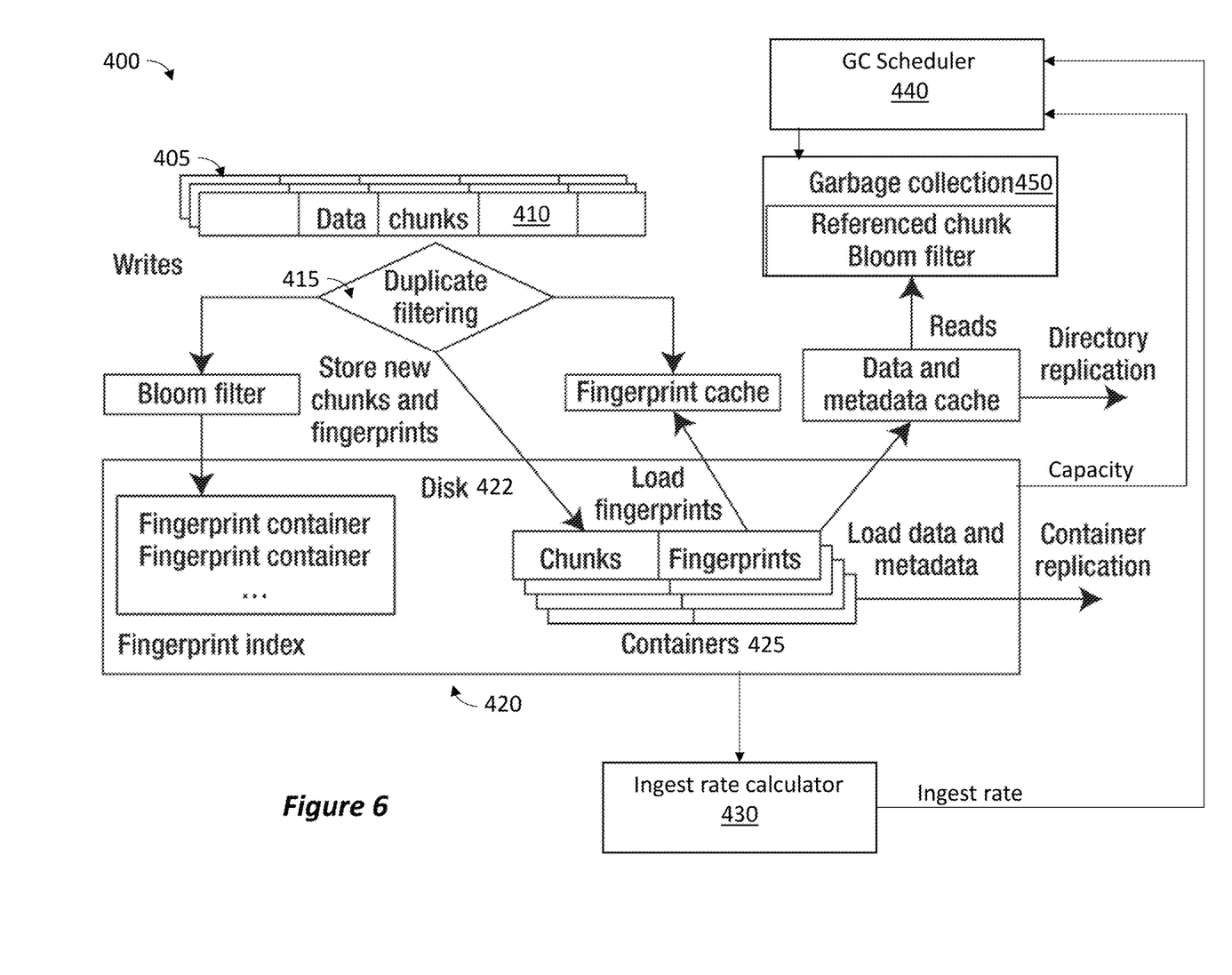
FIG. 6 is a schematic illustrating backup system according to one or more embodiments of the disclosure.

FIG. 6 illustrates an example of a backup system 400 with deduplication and intelligent GC scheduling according to an embodiment. Incoming data 405 is divided into data segments/chunks 410. The dedup filter 415 directs new, i.e., non-duplicate, chunks to storage 420 made of plurality of disks 422, for storage in containers 425. Meanwhile, the ingest rate calculator 430 calculates ingest rate of the storage 420. Additionally, the capacity of the storage system 420 is communicated to the GC scheduler 440. The ingest rate calculator 430 calculates the ingest rate of the storage system and provides the ingest rate to the GC scheduler 440. The GC scheduler 440 periodically uses the ingest rate and the storage capacity to determine when to invoke the garbage collection 450. The ingest rate calculator 430 and the GC scheduler 440 may be implemented according to embodiments disclosed herein.

Thus, disclosed aspects involve a backup system comprising: a plurality of storage disks; a backup processor ingesting and storing data in containers within the storage disks; a garbage collection module operable to clear dead memory space within the storage disks; an ingest rate calculator generating an ingest rate of the backup processor; and a garbage collection scheduler receiving the ingest rate and invoking the garbage collection module by calculating capacity prediction based upon the ingest rate.

Figure 7:
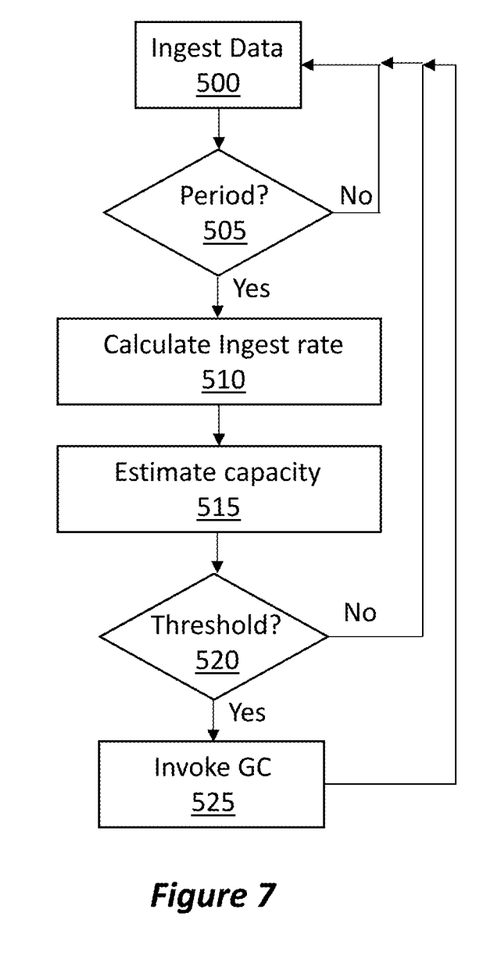
FIG. 7 is a flow chart of a method according to an embodiment.

FIG. 7 is a flow chart of a method according to an embodiment. In 500 data is ingested in a conventional way, e.g., implementing dedup and storing chunks or segments in containers. At 505 it is checked whether time has reached the pre-programmed period P. For example, for average use case a seven-day period may be set. Until the set period is reached, the process continues to ingest data. When the set period is reached, the process proceeds to 510, where the ingest rate is calculated. The ingest rate may be calculated by any desired method or a method disclosed herein. For example, the ingest rate for each of the days in the past period may be calculated and then an average of these rate may be used. Conversely, the linear regression described herein may be used to determine the data ingest rate. At 515 the scheduler uses the ingest rate to estimate the capacity at the end of the set time T. The set time period should be longer than the sum of the period P and the maximum garbage collection processing time G. If at 520 the estimated does not reach the set threshold, the method reverts to continue ingest data. Conversely, if the estimated capacity exceeds the threshold, the garbage collection process is invoked at 525, and the method reverts to continue ingesting data. Of course, throughout the execution of the method of FIG. 5 data ingestion continues as normal.

Thus, disclosed aspects involve a computer program product comprising a non-transitory computer-readable medium having a computer-readable program code embodied therein to be executed by one or more processors, the program code operating in a computing storage system and including instructions to: obtain current capacity utilization of the storage system; obtain ingest rate of the storage system; at start of each preprogrammed time period: use the current capacity utilization and the ingest rate to calculate predicted capacity utilization at end of a run period and, if the predicted capacity utilization reaches a threshold invoke garbage collection and otherwise skip garbage collection.

Figure 8:
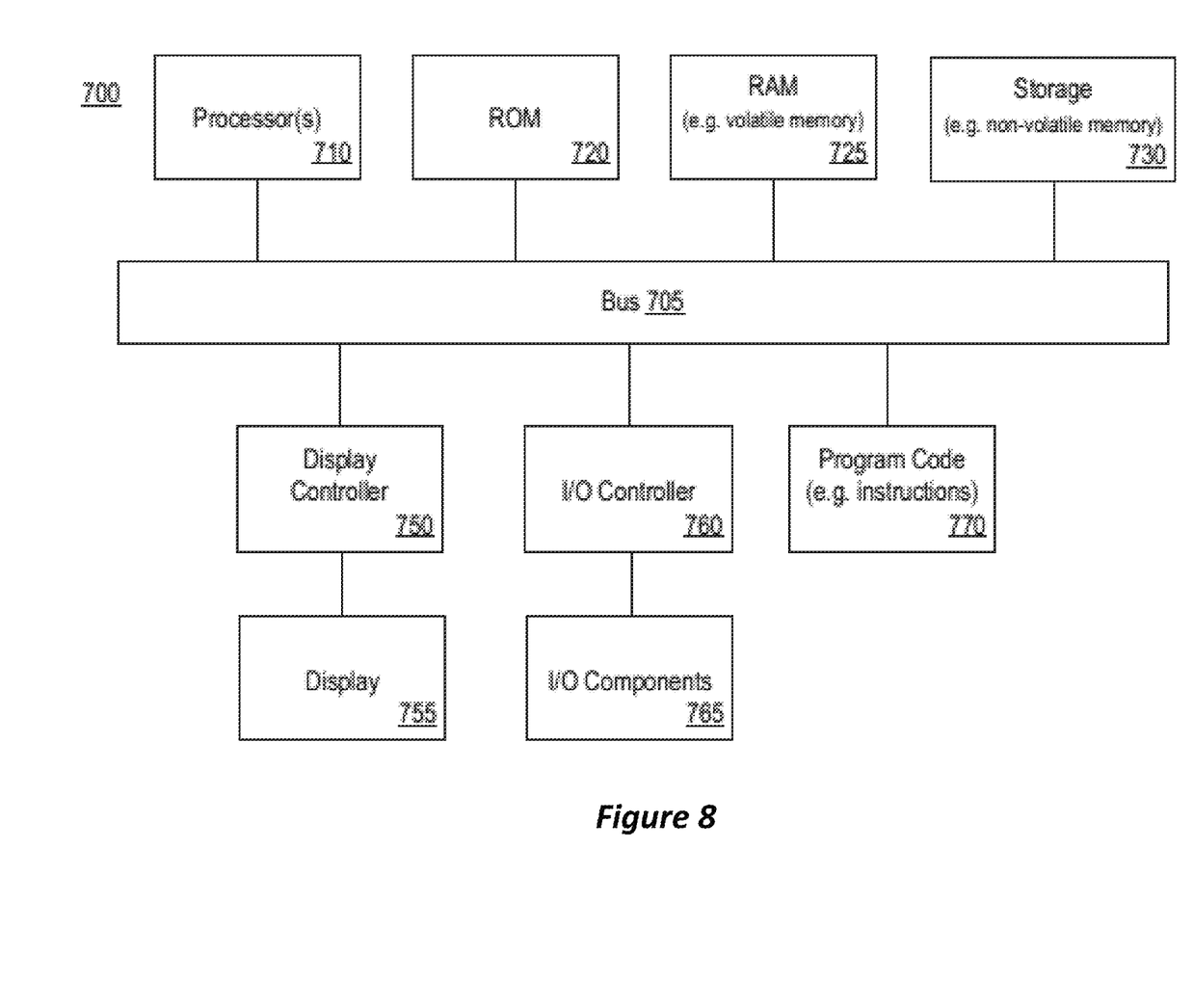
FIG. 8 is a block diagram illustrating an example of a computing system that may be used in conjunction with one or more embodiments of the disclosure.

FIG. 8 shows a block diagram of an example of a computing system that may be used in conjunction with one or more embodiments of the disclosure. For example, computing system 400 (or system, or server, or computing device, or device) may represent any of the devices or systems (e.g. backup component 420, ingest rate calculator 430, GC scheduler 440, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. backup component 150). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified. Reference to ordinal numbers such as "first," "second," "third," etc. may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A computerized method for executing garbage collection in a backup system, the method comprising:
   ingesting data for backup storage;
   at each preset time period:
   obtaining an ingestion rate of the ingesting data based on a slope of a most recent linear segment of an ingest graph;
   obtaining a current system capacity indicating a current amount of storage space occupied by stored data;
   using the ingestion rate and the current system capacity to estimate a prospective system capacity at a future time date equal to or longer than a sum of a preset time period and a garbage collection (GC) run time; and,
   in response to the prospective system capacity at the future time date exceeds a preset threshold invoking a garbage collection (GC), in response to the prospective system capacity at the future time date doesn't exceed the preset threshold skipping the garbage collection until next preset time period.

2. The method of claim 1, further comprising obtaining GC run time indicating time it takes to complete a GC run.

3. The method of claim 1, wherein estimating the prospective system capacity comprises summing up the current system capacity and a product of the ingestion rate and number of days to the future time date.

4. The method of claim 1, wherein obtaining the ingestion rate comprises calculating the ingestion rate for a past time span ending at current time.

5. The method of claim 1, wherein obtaining the ingestion rate comprises fitting a line to a plot of an amount of data ingested over a past time span ending at current time and setting a slope of the line as the ingestion rate.

6. The method of claim 5, wherein fitting a line comprises performing linear regression on an amount of data ingested over a past time span ending at current time.

7. The method of claim 6, wherein performing linear regression comprises performing multiple linear regressions over multiple past time span ending at current time, wherein each of the multiple past time span has a different length.

8. The method of claim 7, wherein the ingestion rate is determined using the linear regression resulting in highest r-squared value or the lowest sum of squared error.

9. A system comprising:
   a plurality of storage disks;
   a backup processor ingesting and storing data in containers within the storage disks;
   a garbage collection module operable to clear dead memory space within the storage disks;
   an ingestion rate calculator generating an ingestion rate of the backup processor based on a slope of a most recent linear segment of an ingest graph;
   a garbage collection scheduler receiving the ingestion rate and invoking the garbage collection module by calculating a capacity prediction based upon the ingestion rate, wherein the garbage collection scheduler includes a non-transitory computer readable medium storing a plurality of instructions, which when executed, cause the garbage collection scheduler to
   calculate the capacity prediction at a future time date equal to or longer than a sum of a preset time period and a garbage collection (GC) run time upon expiration of each preset period of time, and
   invoke the garbage collection module in response to the capacity prediction at the future time date reaches a threshold, skip invoking the garbage collection module in response to the capacity prediction at the future time date is below the threshold.

10. The system of claim 9, wherein the garbage collection scheduler is further to calculate the capacity prediction for a future date beyond next preset period of time.

11. The system of claim 9, wherein the ingestion rate calculator includes a non-transitory computer readable medium storing a plurality of instructions, which when executed, cause the ingestion rate calculator to perform a linear fit on a total amount of data ingested by the backup processor over past time and determine the ingestion rate from the linear fit.

12. The system of claim 11, wherein the ingestion rate calculator is further to perform the linear fit by linear regression over multiple segments of past times.

13. A computer program product comprising a non-transitory computer-readable medium having a computer-readable program code embodied therein to be executed by one or more processors, the program code operating in a computing storage system and including instructions to:
   obtain a current capacity utilization of the storage system;
   obtain an ingestion rate of the storage system based on a slope of a most recent linear segment of an ingest graph;
   at a start of each preprogrammed time period:
   use the current capacity utilization and the ingestion rate to calculate a predicted capacity utilization at a future time date equal to or longer than a sum of a preset time period and a garbage collection (GC) run time at end of a run period and, in response to the predicted capacity utilization at the future time date reaches a threshold invoke a garbage collection, in response to the predicted capacity utilization at the future time date doesn't reach the threshold skip the garbage collection.

14. The computer program product of claim 13, including instructions to define the run period at least as long as sum of the preprogrammed time period and max garbage collection time, wherein max garbage collection time defines the longest time for performing garbage collection on the storage system.

15. The computer program product of claim 13, wherein the program code includes further instructions to obtain the ingestion rate by performing linear fit on a total amount of data ingested by the storage system over past time and determine the ingestion rate from the linear fit.

16. The computer program product of claim 15, wherein the program code includes further instructions to perform the linear fit by linear regression over multiple segments of past times and selecting a linear fit having the least error.

17. The computer program product of claim 16, wherein the program code includes further instructions to obtain the ingestion rate by calculating ingestion rate for a past time span ending at current time.

18. The computer program product of claim 13, wherein the program code includes further instructions to calculate the predicted capacity utilization using a sum of the current capacity utilization and a product of the ingestion rate and the run period.

* * * * *